(12) United States Patent
Veerasamy et al.

(10) Patent No.: US 6,236,852 B1
(45) Date of Patent: May 22, 2001

(54) AUTHENTICATION FAILURE TRIGGER METHOD AND APPARATUS

(75) Inventors: Jey Veerasamy, Richardson; Verne Kirby, Plano, both of TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/210,161

(22) Filed: Dec. 11, 1998

(51) Int. Cl.[7] .............................. H04M 1/66; H04M 1/68; H04M 3/16
(52) U.S. Cl. .................... 455/411; 455/410; 455/433; 380/248
(58) Field of Search .................... 455/410, 411, 455/432, 433; 379/188, 201, 207, 221; 380/248

(56) References Cited

U.S. PATENT DOCUMENTS

| | | | |
|---|---|---|---|
| 5,239,294 | * | 8/1993 | Flanders et al. ............... 455/411 |
| 5,603,081 | * | 2/1997 | Raith et al. ..................... 455/435 |
| 6,081,731 | * | 6/2000 | Boltz et al. ..................... 455/411 |

* cited by examiner

*Primary Examiner*—Nay Maung
(74) *Attorney, Agent, or Firm*—Haynes and Boone, L.L.P.

(57) ABSTRACT

A wireless communications network and method include a home system, a serving system, and authentication failure triggers. The home system includes an authentication center, a network information element, and a prescribed authentication capable mobile station. The authentication center performs an authentication of the prescribed mobile station upon a network access by the mobile station. Authentication includes use of shared secret data particular to the prescribed mobile station. The serving system includes a network access element and a network information element associated therewith. The serving system is capable of performing authentication upon authentication capable mobile stations. Lastly, the authentication failure triggers and shared secret data are shared with the serving system by the authentication center of the home system upon the mobile station's initial system access. The authentication failure triggers include instructions for use by the serving system with respect to authentication failures which may occur during a subsequent serving system access. The authentication triggers direct the serving system to handle authentication failures according to the authentication policies of the home system's authentication center. Therefore, the requirement for the authentication failure report operation is advantageously reduced.

20 Claims, 3 Drawing Sheets

AUTHENTICATION FAILURE TRIGGER METHOD AND APPARATUS

BACKGROUND OF THE INVENTION

1. Field of the Invention

The present invention relates generally to telecommunications, and more particularly, to cellular authentication and voice privacy. The present invention further relates to authentication functions described in the ANSI-41 standard, and more particularly, to the Shared Secret Data (SSD) sharing and authentication failure reporting functions.

2. Discussion of the Related Art

Figure 1:
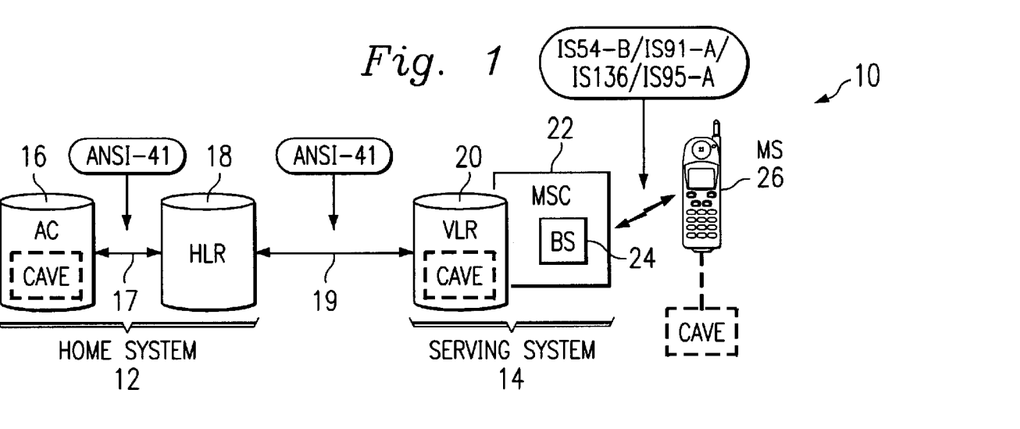
FIG. 1 illustrates a telecommunication cellular network and components thereof known in the art.

With reference to FIG. 1, a telecommunications network 10 illustrates a typical arrangement of functional entities involved in both the SSD sharing and authentication failure reporting functions. Network 10 includes a home system 12 and a serving system 14. In the home system 12, the authentication center (AC) 16 is coupled to the home location register (HLR) 18 via signal lines 17 according to the ANSI-41 standards. The home system 12 is coupled to the serving system 14 via signal lines 19 according to ANSI-41 standards. In particular, signal lines 19 extend between the home location register (HLR) 18 of the home system 12 and the visitor location register (VLR) 20 of the serving system 14. The visitor location register 20 is coupled to a mobile switching center (MSC) 22 of the serving system 14, the MSC 22 being coupled to a base station (BS) 24. The BS 24 then couples a mobile station (MS) 26 to the serving system 14, according to a given air interface protocol such as the IS54-B/IS91-A/IS136/IS95-A standards. Mobile station (MS) 26 is authentication capable and employs a cellular authentication and voice encryption algorithm (CAVE).

Authentication of a mobile station (MS) 26 in a telecommunication network 10 relates to a set of functions used to prevent fraudulent access to cellular networks by phones illegally programmed with counterfeit mobile identification (MIN) and electronic serial number (ESN) information. A successful outcome of authentication occurs when it can be demonstrated that a mobile station (MS) 26 and network 10 possess identical results of an independent calculation performed in both the MS 26 and the network 10. An authentication center (AC) 16 is the primary functional entity in the telecommunications network 10 responsible for acting as authentication controller, although, when SSD is shared, serving system 14 (i.e., the Visitor Location Register (VLR) 20) is allocated some control over the network's authentication responsibilities.

With respect to the allocated responsibilities of the serving system 14 and according to the ANSI-41 standards, the ANSI-41 shared secret data (SSD) sharing function encompasses the processes by which the authentication center (AC) 16 and the serving system 14 (i.e., the visitor location register (VLR) 20) manage the sharing of authentication responsibilities for a visiting mobile station (MS) 26. Serving system control of authentication network functions in this manner reduces the authentication-related signaling traffic between the serving and home systems and the associated call processing delays. Furthermore, shared secret data (SSD) sharing gives the serving system 14 local control over the authentication of a visiting mobile station (MS) 26. Specifically, the serving system 14 can control network functions which include: a) global challenge for all but the initial system access, when SSD sharing is not yet established; b) unique challenge, again for all but the initial system access; c) the base station challenge portion of an authentication center AC-initiated SSD update; and d) count update.

Figure 2:
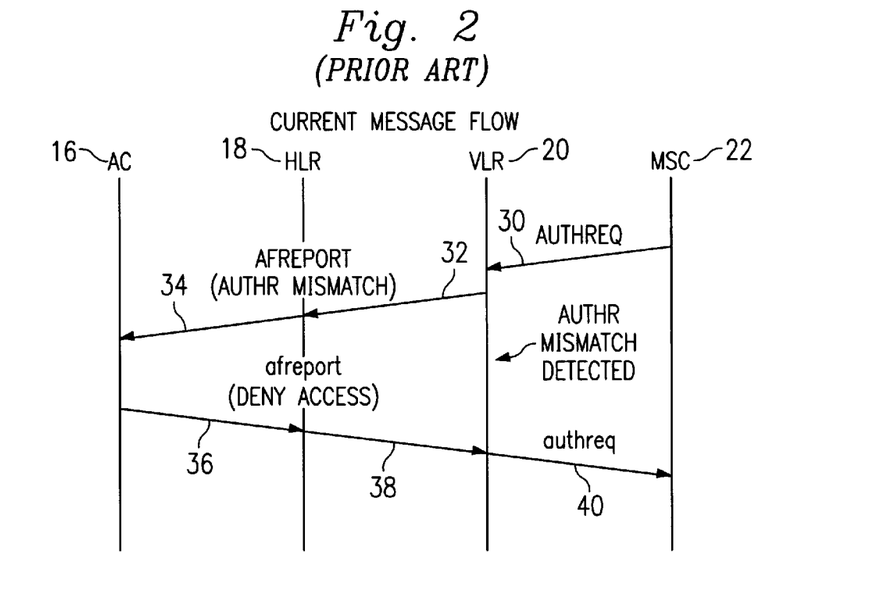
FIG. 2 illustrates a message flow for a simple authentication failure scenario of a mobile station using authentication functions known in the art.

Turning now to FIG. 2, in conjunction with FIG. 1, a message flow diagram of a simple authentication failure scenario with authentication failure report (AFREPORT) and involving an authentication result (AUTHR) mismatch upon mobile origination, registration, or page response while SSD is shared with the serving system is shown. In particular, the authentication failure scenario with authentication failure report (AFREPORT) includes the following steps. In a first step, identified by reference numeral 30, when an authentication-capable mobile station (MS) accesses the system 10, the serving mobile switching center (MSC) 22 sends an authentication request (AUTHREQ) to the serving visitor location register (VLR) 20. In a next step, identified by reference numeral 32, the serving visitor location register (VLR) 20 determines that an Authentication Failure Report (AFREPORT) is necessary due to an AUTHR mismatch and sends an AFREPORT to the home location register (HLR) 18 associated with the mobile station (MS). In a next step 34, the home location register (HLR) 18 forwards the AFREPORT to the authentication center (AC) 16 of the home system 12. The authentication center (AC) 16 then determines that the mobile station (MS) should be denied access (according to the AC's internal authentication algorithms). In a next step 36, the AC 16 returns an afreport to the requesting home location register (HLR) 18 and includes a deny access parameter. In a next step 38, the home location register (HLR) 18 forwards the afreport to the serving visitor location register (VLR) 20. Lastly, in step 40, the serving visitor location register (VLR) 20 forwards the deny access parameter to the serving mobile switching center (MSC) 22 in the authreq, instructing the serving mobile switching center (MSC) 22 to deny access to the particular mobile station (MS) 26.

Figure 3:
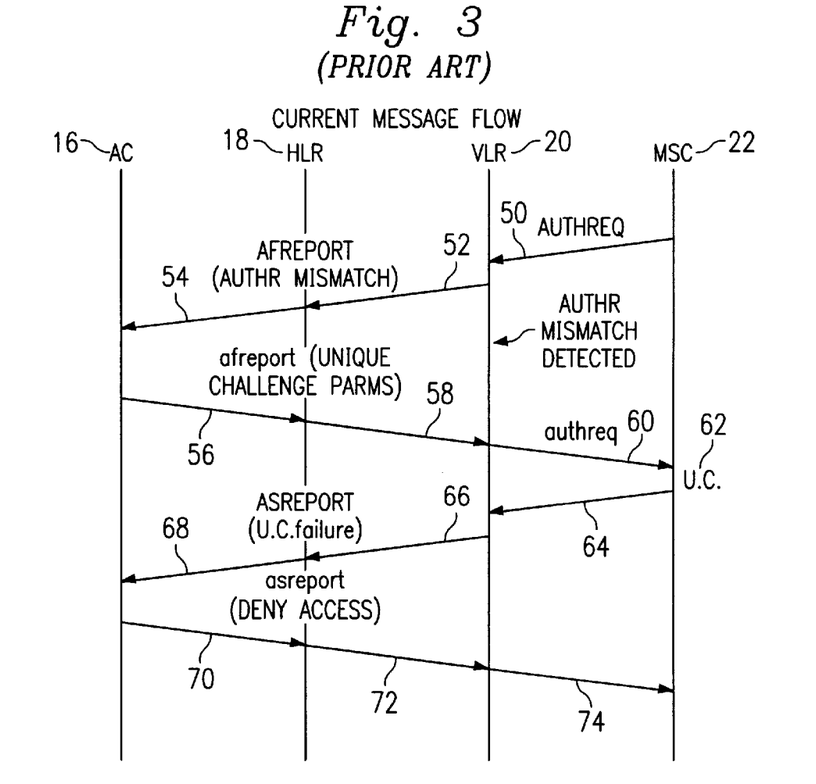
FIG. 3 illustrates a message flow for a complex authentication failure scenario of a mobile station using authentication functions known in the art.

Turning now to FIG. 3, also in conjunction with FIG. 1, a message flow diagram of a complex authentication failure scenario with AFREPORT and involving an AUTHR mismatch upon mobile origination, registration, or page response while SSD is shared with the serving system is shown. In particular, the authentication failure scenario with AFREPORT includes the following steps. In a first step 50, when an authentication-capable mobile station (MS) 26 accesses the system 10, the serving mobile switching center (MSC) 22 sends an authentication request (AUTHREQ) to the serving visitor location register (VLR) 20. In a next step 52, the serving visitor location register (VLR) determines that an Authentication Failure Report (AFREPORT) is necessary due to an AUTHR mismatch and sends an AFREPORT to the home location register (HLR) 18 associated with the mobile station (MS) 26. In a next step 54, the home location register (HLR) 18 forwards the AFREPORT to the authentication center (AC) 16 of the home system 12. The authentication center (AC) 16 then determines that a unique challenge (U.C.) should be performed on the mobile station (MS) 26 according to the authentication center's internal authentication algorithms. In a next step 56, the AC 16 returns an afreport to the requesting home location register (HLR) 18 and includes the unique challenge (UC) parameters. In a next step 58, the home location register (HLR) 18 forwards the afreport to the serving visitor location register (VLR) 20. In a next step 60, the serving visitor location register (VLR) 20 forwards the unique challenge (U.C.) parameters to the serving mobile switching center (MSC) 22 in the authreq, instructing the serving mobile switching center (MSC) 22 to perform a unique challenge (U.C.) 62 on the mobile station (MS) 26. The serving mobile switching center (MSC) 22 then determines that the unique challenge (U.C.) fails and reports the same via an authentication status report (ASREPORT). In a next step 64, the mobile switching center (MSC) 22 sends an ASREPORT to the serving visitor location register (VLR) 20. In a next step 66, the serving visitor location register (VLR) 20, noting that the report is not for an operation it has initiated, forwards the ASREPORT to the home location register (HLR) 18 associated with the mobile station (MS) 26. In a next step 68, the home location register (HLR) 18 forwards the ASREPORT to the authentication center (AC) 16. The authentication center (AC) 16 then determines that the mobile station (MS) 26 should be denied access according to the authentication center's internal authentication algorithms. In a next step 70, the authentication center (AC) 16 returns an asreport to the requesting home location register (HLR) 18 and includes the deny access parameter. In a next step 72, the home location register (HLR) 18 forwards the asreport to the serving visitor location register (VLR) 20. In a next step 74, the serving visitor location register (VLR) 20 forwards the asreport to the serving mobile switching center (MSC) 22, instructing the serving mobile switching center (MSC) 22 to deny access to the mobile station (MS) 26.

With previous known ANSI-41 implementations, the serving system mobile switching center (MSC) 22 and visitor location register (VLR) 20 send a networking message to the authentication center (AC) 16 for every authentication failure which is encountered (FIG. 1). For each individual authentication failure networking message from the mobile switching center (MSC) 22 and visitor location register (VLR) 20, the authentication center (AC) 16 responds with the action to be taken according to its internal authentication algorithms.

While the above described sharing of authentication responsibilities for a visiting mobile station occurring between the authentication center (AC) of the home system and the serving system 14, wherein serving system control of authentication network functions as described reduces authentication-related signaling traffic between the serving and home systems and the associated call processing delays, further improvement is desired. That is, further reduction in authentication-related signaling traffic between the serving and home systems is desired. Further reduction in associated call processing delays is also desired.

SUMMARY OF THE INVENTION

The authentication failure trigger method and apparatus of the present disclosure overcomes problems in the art as discussed herein. The SSD sharing function and authentication failure reporting function are enhanced, such that, the requirement for a authentication failure report (AFREPORT) operation is advantageously reduced. A further reduction of authentication-related signaling traffic between the serving and home systems and the associated call processing delays is accomplished. An additional feature of the present method and apparatus is that network resources may be freed from fraudulent mobile stations (MSs) more quickly than previously possible.

According to the present disclosure, the authentication failure trigger method and apparatus allow the home system to share authentication failure handling instructions via authentication failure triggers with the serving system during an SSD sharing function.

In accordance with one embodiment, a method of performing authentication of a mobile station in a wireless communications network includes the steps of providing a home system having an authentication center, a network information element, and a prescribed authentication capable mobile station of the home system. A serving system including a network access element and a network information element associated with the network access element is provided. Furthermore, the serving system is capable of sharing SSD and performing authentication. Lastly, upon a mobile station's initial system access, the serving system sends an authentication request (AUTHREQ) to the home system. The home system authenticates the mobile station and elects to share shared secret data (SSD) and authentication failure triggers (AFTRIGS) with the serving system according to the authentication center's internal authentication algorithms. The authentication failure triggers (AFTRIGS) instruct the serving system on how to handle various authentication failure conditions which may occur on subsequent system accesses of the mobile subscriber while being served by the serving system. Therefore, upon a subsequent system access of the mobile station which results in an authentication failure, the serving system can handle the authentication failure without requiring an authentication failure report (AFREPORT) message to be sent to home system. This allows the serving system to release call processing resources more rapidly than previously and reduces network signaling traffic.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which.

DESCRIPTION OF A PREFERRED EMBODIMENT

Figure 4:
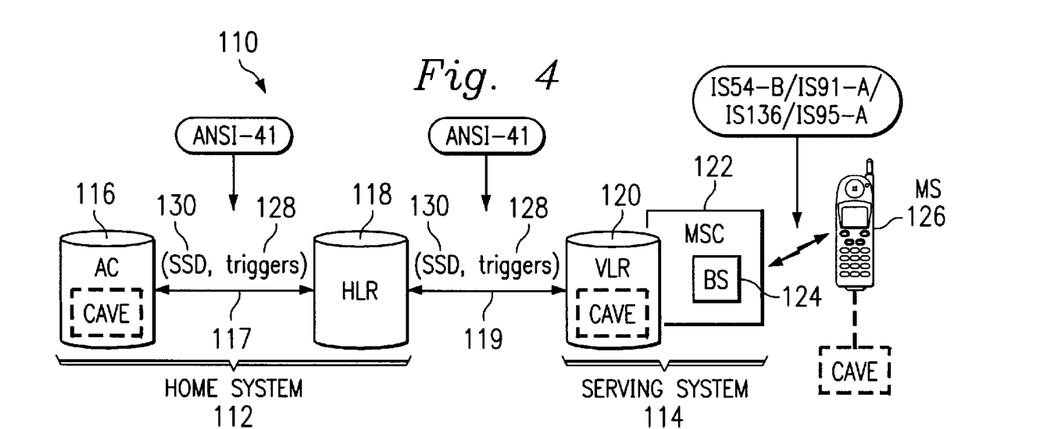
FIG. 4 illustrates a telecommunication cellular network and components thereof, the network incorporating authentication failure triggers according to the present disclosure.

Turning now to FIG. 4, a telecommunications network 110 includes an arrangement of functional entities involved in both the SSD sharing and authentication failure reporting functions, further including authentication failure triggers according to the present disclosure. Telecommunications network 110 includes a home system 112 and a serving system 114. In the home system 112, the authentication center (AC) 116 is coupled to the home location register (HLR) 118 via signal lines 117 according to the ANSI-41 standards. The home system 112 is coupled to the serving system 114 via signal lines 119 according to ANSI-41 standards. In particular, signal lines 119 extend between the home location register (HLR) 118 of the home system 112 and the visitor location register (VLR) 120 of the serving system 114. The visitor location register 120 is coupled to a mobile switching center (MSC) 122 of the serving system 114, the MSC 122 being coupled to a base station (BS) 124. The BS 124 then couples a mobile station (MS) 126 to the serving system 114, according to an air interface protocol, such as the IS54-B/IS91-A/IS136/IS95-A standards.

The method and apparatus of the present disclosure provide enhanced authentication and are particularly useful with respect to authentication of a mobile station (MS) 126 by a serving system 114. The authentication failure trigger method and apparatus of the present disclosure utilize various nodes of a wireless telecommunication (or telecom) network 110, including the mobile switching center (MSC) 122, the visitor location register (VLR) 120, and the authentication center (AC) 116, to perform authentication functions in an improved way with the use of authentication failure triggers.

The present method and apparatus for providing authentication failure triggers is implemented via the authentication center (AC) of a home system as follows. In response to an initial access by a valid mobile station (MS) 126 to a serving system 112, the authentication center (AC) 116 instructs the visitor location register (VLR) 120 of the serving system 114 on how to handle various authentication related failures, i.e., how to expressly handle a particular authentication related failure. In other words, the authentication center (AC) 116 instructs the visitor location register (VLR) 120 by sending authentication failure triggers 128 along with shared secret data (SSD) 130 to the visitor location register (VLR) 120. Sending of authentication failure triggers 128 along with shared secret data (SSD) 130 will be further explained herein below.

Through the use of authentication failure triggers, the present method and apparatus advantageously solves various problems in the art. For instance, with authentication failure triggers, the number of authentication related networking messages is further reduced and hence any adverse impact as a result of the authentication process on the wireless network is further minimized. In addition, the authentication failure trigger method and apparatus of the present disclosure advantageously assists in the knocking off of fraudulent mobile stations from the system in a timely manner. That is, the authentication failure trigger method and apparatus of the present disclosure advantageously assist in denying fraudulent mobile stations from using system resources quicker than previously possible, i.e., on short order.

In accordance with the authentication failure trigger method and apparatus of the present disclosure, the problems in the art as discussed herein above are solved in that upon authenticating a mobile station's initial system access, the authentication center (AC) 116 of the home system 112 sends shared secret data (SSD) 130 and authentication failure triggers 128 to the VLR (120) of the serving system 114. The VLR (120) of the serving system 114 then uses the authentication failure trigger information to act upon authentication failures which may occur thereafter.

Authentication failure triggers (AFTRIGS) 128 of the present disclosure are associated with various authentication failure conditions, for example, as discussed herein below. Various authentication failures may include the following failures:

A. AUTHR (Authentication result.) mismatch;
B. U.C. (Unique Challenge) failure/no response;
C. RANDC mismatch; and
D. Missing authentication parameters; etc.

The above mentioned authentication failures currently warrant an authentication failure report (AFREPORT) operation. In accordance with the present disclosure, each failure condition is assigned a corresponding trigger (i.e., A, B, C, D, etc.) to be associated with it. Still further, appropriate failure actions are associated with each trigger. For example, such failure actions may include:

1. Deny access;
2. Deny access and convey report to the authentication center (AC);
3. Perform unique challenge;
4. Allow access;
5. Allow access and convey report to the authentication center (AC); and
6. Report to authentication center (AC) and wait for response.

For further illustration, consider the following example of a set of authentication failure triggers (AFTRIGS) 128 which may include A-3, B-1, C-3, and D-1 for a given mobile station (MS) 126 situation. The authentication failure trigger A-3 signifies to the VLR (120) of the serving system 114 that if an AUTHR mismatch authentication failure occurs, then do a unique challenge with the mobile station (MS) 126. The authentication failure trigger B-1 signifies to the VLR (120) of the serving system 114 that if a U.C. failure/no response authentication failure occurs, then deny the mobile station (MS) 126 access to the system 110. The authentication failure trigger C-3 signifies to the VLR (120) of the serving system 114 that if a RAND C mismatch authentication failure occurs, then do a unique challenge with the mobile station (MS) 126. Lastly, the authentication failure trigger D-1 signifies to the VLR (120) that if a missing authorization parameters authentication failure occurs, then deny the mobile station (MS) 126 access to the system 110. In addition to the exemplary authentication failure triggers discussed, other authentication failure triggers for use and in conjunction with a particular mobile station (MS) 126 are contemplated also. Through the use of authentication failure triggers 128 in accordance with the present embodiments, the authentication failure triggers 128 advantageously eliminate the relaying of the occurrence of an authentication failure from the VLR (120) of the serving system 114 to the authentication center (AC) 112 of the home system, unless a particular instance required such a relaying of an authentication failure occurrence. Furthermore, the authentication failure triggers 128 enable the VLR (120) of the serving system 114 not to have to wait for a response from the authentication center (AC) 116 when an authentication failure occurs.

The present disclosure thus describes an authentication failure trigger method and apparatus for use in the authentication process of an ANSI-41 network. The mobile station (MS) 126 is a functional entity that generally represents the mobile radio-telephone equipment. The base station (BS) 124 is a functional entity that represents all the functions that terminate radio communications at the network side of the MS interface to the cellular network 110. The mobile switching center (MSC) 122 is a functional entity that represents an automatic switching system. This switching system constitutes the interfaces for user traffic between the cellular network 110 and other public switched networks, or other MSCs in the same or other networks. The MSC 122 provides the basic switching functions and coordinates the establishment of calls to and from the cellular subscribers. The visitor location register (VLR) 120 is a functional entity that represents the local database, control, and processing functions that maintain temporary records associated with individual network subscribers. The home location register (HLR) 118 is a functional entity that represents the primary database repository of subscriber information used to provide control and intelligence in the cellular and wireless networks. The authentication center (AC) 116 is a functional entity that represents the authentication functions used to verify and validate a mobile station's identity.

According to the present authentication failure trigger method and apparatus, the SSD sharing function and authentication failure reporting function are enhanced, such that, the requirement for a authentication failure report (AFREPORT) operation is reduced. The authentication failure trigger method and apparatus advantageously allows the home system 112 to share authentication failure handling instructions with the serving system 114 during the SSD sharing function. As a result, the present method and apparatus provide a further reduction of authentication-related signaling traffic between the serving and home systems and the associated call processing delays. An additional feature of the present method and apparatus is that network resources may be freed from fraudulent mobile stations (MSs) more quickly than previously possible.

Figure 5:
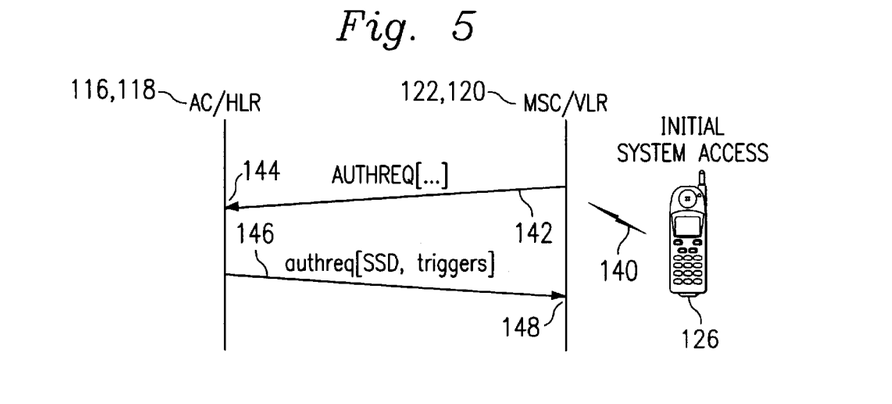
FIG. 5 illustrates a message flow during an initial system access according to the authentication failure trigger method and apparatus embodiments of the present disclosure.

Turning now to FIG. 5, in conjunction with FIG. 4, sharing of authentication failure triggers with the serving system according to one embodiment of the present disclosure will now be discussed. FIG. 5 is a message flow diagram of an initial system access and illustrates the manner in which authentication failure triggers are shared with a serving system on a mobile station's initial system access. In particular, sharing of authentication failure triggers includes the following steps. In a first step, identified by reference numeral 140, when an authentication-capable mobile station (MS) 126 initially accesses the system 110, the serving mobile switching center (MSC) 122 sends an authentication request (AUTHREQ) to the serving visitor location register (VLR) 120. In a next step 142, the serving visitor location register (VLR) 120 forwards the authentication request (AUTHREQ) to the home location register (HLR) 118 associated with the mobile station (MS) 126. In a next step 144, the home location register (HLR) 118 forwards the AUTHREQ to the authentication center (AC) 116 of the home system 112. The authentication center (AC) 116 of the home system 112 then determines that it is able to share shared secret data (SSD) 130 and authentication failure triggers (AFTRIGS) 128 with the serving system 114. The authentication center (AC) 116 returns an authentication request (authreq) to the requesting home location register (HLR) 118 and includes the shared secret data (SSD) 130 and authentication failure trigger (AFTRIGS) 128 parameters. In a next step 146, the home location register (HLR) 118 forwards the authentication request (authreq) to the serving visitor location register (VLR) 120. Lastly, in step 148, the serving visitor location register (VLR) 120 stores the shared secret data (SSD) 130 and the authentication failure triggers (AFTRIGS) 128 in the mobile station's (MS's) database entry and forwards the authreq to the serving mobile switching center (MSC) 122.

Figure 6:
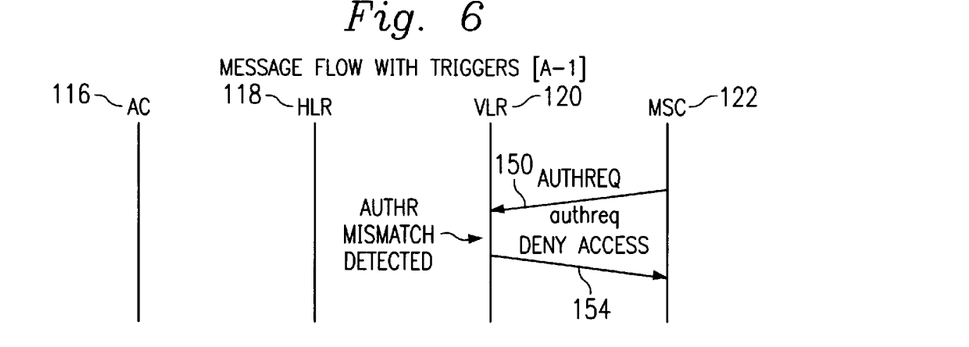
FIG. 6. illustrates a message flow for a simple authentication failure scenario of a mobile station using the authentication failure trigger method and apparatus embodiments of the present disclosure.

Referring now to FIG. 6, in conjunction with FIG. 4, an authentication failure scenario utilizing the authentication failure trigger method and apparatus according to an embodiment of the present disclosure shall now be discussed. FIG. 6 is a message flow diagram illustrating a simple authentication failure scenario involving an AUTHR mismatch upon mobile origination, registration, or page response while shared secret data (SSD) 130 and authentication failure triggers (AFTRIGS) 128 are shared with the serving system 114. In a first step 150, when an authentication-capable mobile station (MS) 126 accesses the system 110 (subsequent to an initial access), the serving mobile switching center (MSC) 122 sends an AUTHREQ to the serving visitor location register (VLR) 120. In a next step 152, the serving visitor location register (VLR) 120 determines an AUTHR mismatch has occurred and returns a deny access parameter to the serving mobile switching center (MSC) 122 based on its (i.e., the VLR's) authentication failure triggers (AFTRIGS) 128. In this example, the authentication failure trigger included A-1.

Figure 7:
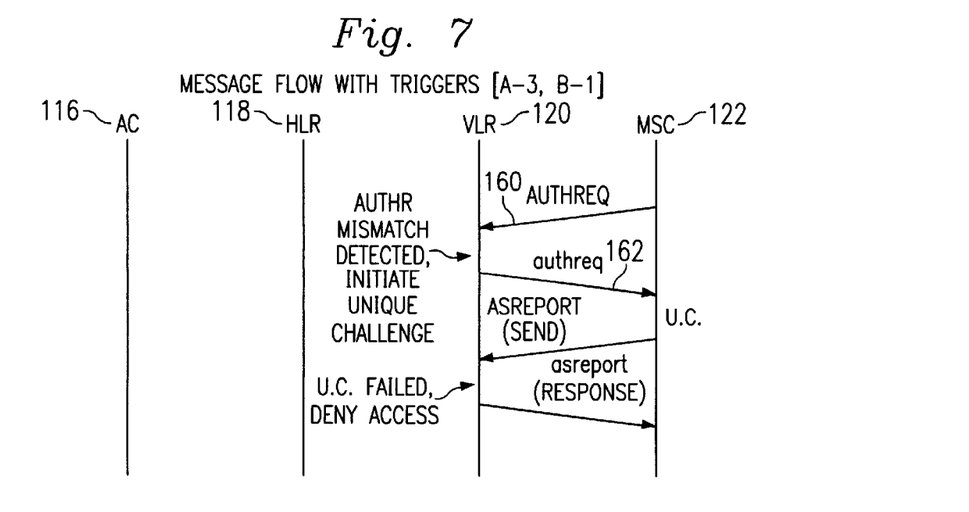
FIG. 7. illustrates a message flow for a complex authentication failure scenario of a mobile station using the authentication failure trigger method and apparatus embodiments of the present disclosure.

Referring now to FIG. 7, in conjunction with FIG. 4, a complex authentication failure scenario utilizing the authentication failure trigger method and apparatus according to an embodiment of the present disclosure shall now be discussed. In FIG. 7, a message flow diagram illustrating a complex authentication failure scenario involving an AUTHR mismatch upon mobile origination, registration, or page response while shared secret data (SSD) 130 and authentication failure triggers (AFTRIGS) 128 are shared with the serving system 114. In particular, the authentication failure scenario includes the following steps. In a first step 160, when an authentication-capable mobile station (MS) 126 accesses the system 110 (subsequent to an initial access), the serving mobile switching center (MSC) 122 sends an authentication request (AUTHREQ) to the serving visitor location register (VLR) 120. In a next step 162, the serving visitor location register (VLR) 120 determines that an AUTHR mismatch has occurred and returns unique challenge (U.C.) parameters to the serving MSC 122 based on its authentication failure triggers (AFTRIGS) 128 associated with the mobile station (MS) 126, further including instructions for the serving mobile switching center (MSC) 122 to perform a unique challenge (U.C.) on the mobile station (MS) 126. At step 164, the serving mobile switching center (MSC) 122 determines that the unique challenge (U.C.) fails and an authentication status report (ASREPORT) is sent reporting the U.C. failure. The mobile switching center (MSC) 122 sends an ASREPORT to the serving visitor location register (VLR) 120. In a next step 166, the serving visitor location register (VLR) 120 determines that the mobile station (MS) 126 should be denied access based upon the authentication failure triggers (AFTRIGS) of the particular mobile station 126 . The serving visitor location register (VLR) 120 returns an asreport including the deny access parameter instructing the serving MSC 122 to deny access to the particular mobile station (MS) 126.

In the present system, shared secret data (SSD) 130 sharing enables the visitor location register (VLR) 120 of the serving system 114 to perform authentication, instead of sending a request to the authentication center (AC) 116 of the home system 112. However, all authentication failure actions are determined by the authentication center (AC) 116 of the home system 112. Authentication failure triggers 128 according to the present disclosure advantageously enable the authentication center (AC) 116 to share information about authentication failure actions with the visitor location register (VLR) 120 of the serving system 114 during SSD 130 sharing. The method and apparatus of the present disclosure thus advantageously further reduce network messaging impact with respect to performing an authentication of a mobile station (MS). Also, as the visitor location register (VLR) makes decisions in accordance with the authentication failure triggers 128 instead of the authentication center (AC), fraudulent mobile stations (MSs) can be knocked off from system resources quicker. That is, fraudulent or unauthorized mobile stations will be denied access to the system in a more timely manner, thus preserving valuable system resources for only authorized mobile stations.

The embodiments of the authentication failure trigger method and apparatus of the present disclosure provide a maximum advantage when access and authentication requests from valid mobile stations and fraudulent mobile stations are processed by the same visitor location register (VLR). Authentication failure trigger information which defines the particular authentication failure trigger for a given mobile station (MS) will occupy some portion or amount of space in a visiting location register (VLR) entry, each visiting location register entry corresponding to a given mobile station (MS) visiting the particular serving system.

In further discussion the present disclosure, a method of performing authentication of a mobile station (MS) in a wireless communications network having an authentication center (AC) includes the following steps. A network access element of a serving system is provided, wherein the network access element reacts to a system access from the mobile station (MS) by sending an authentication request message. A network information element associated with the network access element of the serving system is also provided. Previously, upon the mobile station's (MS) initial system access, the authentication center (AC) of the mobile station's (MS) home system shared SSD and authentication failure triggers with the network information element. With respect to the network information element, the network information element processes the authentication request message by validating the authentication information received from the mobile station (MS) and verifying the mobile station's (MS) numeric authentication response to determine if the mobile station (MS) is a valid user. In addition, the network information element of the serving system resolves any negative outcome of the validation and verification without contacting the network authentication center (AC) of the home system by either further challenging the mobile station (MS) or denying access to the mobile station (MS).

According to the above described method of the present disclosure, the network access element includes a mobile switching center (MSC) of the serving system. In addition, the network information element includes a visiting location register (VLR) of the serving system. Further in accordance with the above described method, the process of authenticating the mobile station includes the validation of the authentication information received from the mobile station (MS) and the verification of mobile station's (MS) numeric authentication response.

With respect still to the method of the present disclosure, the procedure followed by the network information element includes the resolution of authentication failures according to the authentication failure triggers received from the authentication center (AC) of the mobile station's (MS) home system. The authentication center (AC) assigns a mobile station's (MS) authentication failure triggers according to its own internal authentication policy. The authentication triggers can include one or more of the following group consisting of AUTHR (authentication result) mismatch, U.C. (unique challenge) failure/no response, RANDC mismatch, and missing authentication parameters. In addition, each trigger contains a prescribed action which may include one of the following selected from the group consisting of (i) deny access, (ii) deny access and convey an AFREPORT to the authentication center, (iii) perform a unique challenge, (iv) allow access to the communications network, (v) allow access to the communications network and convey an AFREPORT to the authentication center, and (vi) convey an AFREPORT to the authentication center and await a response. Other prescribed triggers and actions may be possible and/or desired.

In accordance with another embodiment of the present disclosure, a wireless communications network 110 includes a home system 112 having an authentication center (AC) 116 for performing authentication of a mobile station (MS) 126. (See FIG. 4). The communications network 110 further includes a network access element 122 of a serving system 114 which is responsive to an access communication from the mobile station (MS) 126 visiting the serving system 114. That is, the network access element 122 initiates a first AUTHREQ authentication request message in response to the access communication from the mobile station (MS) 126.

The communications network 110 further includes a network information element 120 of the serving system 114 associated with the network access element 122. The network information element 120 is responsive to the authentication request (AUTHREQ) message in the following manner. In response to the authentication request message, the network information element 120 processes the authentication request message by validating the authentication information received from the mobile station (MS) 126 and comparing the mobile station's (MS) 126 numeric authentication response to the value computed by the network information element 120.

In another instance, the first authentication procedure includes prioritizing the authentication failures according to a prescribed order. The first authentication procedure then determines a level of authentication failure based upon the prioritized authentication failures to determine if the mobile station (MS) 126 is a valid user. The prioritized authentication failures may include AUTHR mismatch, U.C. (unique challenge) failure/no response, RANDC mismatch, and missing authentication parameters, prioritized according to a desired priority order.

Still further, with respect to the wireless communications network 110 having authentication failure triggers 128 according to the present disclosure, the first authentication procedure or test may also include a prescribed action which is a function of the determined level of authentication failure. The prescribed action may include one of the following selected from the group consisting of (i) deny access, (ii) deny access and convey an AFREPORT to the authentication center, (iii) perform a unique challenge, (iv) allow access to the communications network, (v) allow access to the communications network and convey an AFREPORT to the authentication center, and (vi) convey an AFREPORT to the authentication center and await a response.

As discussed herein, the present embodiments are specific to ANSI-41 standard for authentication, however, the present embodiments can also be applicable to other authentication standards. The ANSI-41 standard includes a shared secret data (SSD) function. The SSD function allows for a home cellular system to share secret data with a serving cellular system. For purposes of further illustration, let's assume for example, that the home cellular system for a particular mobile station is Dallas, Tex. and that the mobile station user travels to New York, N.Y. with the mobile station. To use the mobile station in New York, the mobile station must first be authenticated (according to the ANSI-41 standard).

Authentication is a method of authenticating a mobile station (MS) before or during the mobile station's access to the cellular communication system. In other words, if the mobile station is fraudulent, the fraudulent mobile station would be denied access to the cellular communication system. The key used to perform authentication of the handset mobile station is the shared secret data (SSD).

The present invention relates to the sharing of SSD and authentication failure triggers with a serving system. In our illustration, we suppose that a mobile subscriber is homed in a system based in Dallas, Tex. We suppose further that the mobile subscriber roams to New York, N.Y., where he uses his mobile station. When the subscriber initially accesses the system in New York, the Dallas system shares the mobile station's SSD and authentication failure triggers with the serving system in New York. The sharing of SSD and authentication failure triggers gives the New York system significant local control over the authentication of the visiting subscriber. Serving system control of authentication and authentication failures reduces the authentication-related signaling traffic between the serving and home systems and the associated call processing delays. If SSD were not shared, the New York system is required to send an authentication-related message to the Dallas system each time the mobile station accesses the system in order to authenticate the mobile station. SSD sharing alleviates this requirement.

There are a number of authentication-related failures which may occur when a mobile subscriber accesses a serving system. For example, common authentication failures include AUTHR mismatch, unique challenge failure, RANDC mismatch, and missing authentication parameters. The AUTHR mismatch failure occurs when the authentication result computed by the mobile station is different than the authentication result computed by the serving system.

While the mobile subscriber is in New York, let's assume one of the mentioned authentication failures occurs. According to the current mobile communications standards, upon the occurrence of the authentication failure, a message is sent to the home system in Dallas, that is, an AFREPORT message. The AFREPORT message is used to report the failure of a serving system-initiated authentication process to the authentication center of the home system. The authentication center in Dallas must then instruct the serving system in New York as to how to handle the authentication failure. For example, the authentication center may instruct the serving system to allow access, deny access, or perform a unique challenge.

According to the embodiments of the present disclosure, when the mobile subscriber roams to New York and initially accesses the system, both the SSD and authentication failure triggers are shared with the New York system by the authentication center of the Dallas system. By sharing the authentication failure triggers along with the SSD, the New York system may assume control over the handling of authentication failures for the Dallas subscriber. Upon the occurrence of subsequent authentication failures, the New York system can handle the failure without having to perform an AFREPORT operation with the Dallas system. According to the present embodiment, the serving system in New York has been directed via the authentication failure triggers as to how to handle authentication failures for a mobile subscriber according to the policy of the authentication center of the home system in Dallas.

The advantage of sending authentication failure triggers along with the SSD is twofold. First, in an instance where a serving system is performing authentication, it is reasonable to assume authentication failures will occur. One advantage would include the reduction of AFREPORT-related signaling traffic over the communication network, between the serving system and the home system. With the prior technique, an AFREPORT operation is required for every authentication failure occurrence. Additionally, while the New York system is awaiting a response to the AFREPORT from the authentication center of the Dallas system, a fraudulent mobile station may be using the call processing resources of the serving system. In other words, with the prior technique, a fraudulent mobile station would potentially tie up the call processing resources of the New York system for a longer duration than would be required if the New York system was able to act immediately and deny access to the fraudulent mobile station. Without authentication failure triggers, a fraudulent mobile station would be able to use the New York system's call processing resources until the response to the AFREPORT message was received from the Dallas system, where the response would include instructions as to how to handle the authentication failure. With authentication failure triggers, the serving system may act immediately on an authentication failure and more quickly deny access to fraudulent mobile subscribers.

An essential feature of the present embodiment is that the authentication center of the home system shares authentication failure instructions, for subsequent potential execution by the serving system, at the same time as SSD is shared. Referring again to our example, the Dallas home system would share SSD and instructions, i.e., via the authentication failure triggers, with the New York serving system upon an initial access by the mobile station to the NY serving system. The authentication failure triggers inform the NY serving system on how to handle authentication failure conditions with respect to the given mobile station subsequent to the initial system access.

With the prior known method, the occurrence of a given authentication failure situation requires the sending of a message from the serving system back to the home system requesting instructions from the home system on how to proceed. That is, in the prior known method, only after a message is sent from the serving system to the home system does the home system instruct the serving system on how to handle the particular situation.

The present embodiments address authentication and special features which particularly relates to when there is an authentication failure. The present embodiments enable authentication procedure signaling traffic on the communication system, i.e., between the home system and the serving system, to be kept to a minimum. In addition, fraudulent mobile stations can be terminated from the serving system more quickly than previously achievable. The process of detecting and removing fraudulent mobile stations from the serving system is now more efficient and expedient.

The home system shares authentication failure instructions (via authentication failure triggers) with the serving system at the same time as SSD is shared. SSD is shared upon an initial system access to the serving system by a mobile station.

The present embodiments thus include a method and apparatus for advantageously handling authentication failures in a serving system, thereby reducing authentication-related signaling traffic between the serving and home systems. Furthermore, the method of handling authentication failures in the serving system advantageously reduces call processing delays normally associated with authentication-related signaling traffic. The present embodiments further include a method and apparatus for the rapid release of network resources from fraudulent mobile subscribers. The present embodiments still further include a given set of authentication failure triggers and values, the triggers and values being used to convey authentication failure-related handling information to the serving system during a shared secret data (SSD) sharing function.

While the invention has been particularly shown and described with reference to the preferred embodiment thereof, it will be understood by those skilled in the art that various changes in form and detail may be made therein without departing form the spirit and scope of the invention, as set forth in the following claims.

What is claimed is:

1. A method of performing authentication of a mobile station in a wireless communications network said method comprising the steps of:
    providing a home system having an authentication center, a network information element, a prescribed authentication capable mobile station of the home system, the authentication center being a primary controller of the authentication process;
    providing a serving system having a network access element and a network information element associated with the network access element, the serving system being capable of performing authentication of the mobile station if directed by the home system's authentication center; and
    providing authentication failure triggers shared by the authentication center of the home system with the serving system, wherein upon a mobile station's initial system access within a service region of the serving system, an authentication request operation is conducted between the serving system and home system, by which the home system's authentication center authenticates the mobile station and if authentic, then shares the mobile station's shared secret data and authentication failure triggers with the serving system, the authentication failure triggers including instructions for use by the serving system to resolve authentication failures which may occur on subsequent system accesses within the serving system's service region, to handle authentication failures of the prescribed mobile station without requiring the serving system to send any subsequent authentication failure report messages to the home system.

2. The method of claim 1, wherein the network access element of the serving system initiates an authentication request operation (AUTHREQ) upon a system access of mobile station;
    the network information element processes the authentication request by verifying a correctness of the authentication information, including a numeric authentication response from the mobile station, and
    if the verification results in an authentication failure, then the network information element directs the network access element to complete the authentication operation according to the mobile station's authentication failure triggers without contacting the home system's authentication center.

3. The method of claim 2, wherein the network access element includes a mobile switching center (MSC).

4. The method of claim 2, wherein the network information element includes a visitor location register (VLR).

5. The method of claim 2, wherein the first authentication request operation includes an evaluation of the mobile station's authentication response locally in the serving system network information element.

6. The method of claim 2, wherein the network access element includes a mobile switching center (MSC), wherein the network information element includes a visitor location register (VLR), and wherein the processing of the authentication request operation includes an evaluation of the mobile station's authentication response locally in the serving system network information element.

7. The method of claim 2, wherein the mobile station's authentication failure triggers are referenced by the network information element of the serving system when an authentication failure occurs in order to direct the network access element of the serving system on how to complete the authentication operation, according to a prescribed policy of the authentication center of the home system.

8. The method of claim 7, wherein the mobile station's authentication failure triggers contain at least a subset of the following triggers selected from the group consisting of:
    authentication result (AUTHR) mismatch, unique challenge (U.C.) failure/no response, RANDC mismatch, and missing authentication parameters.

9. The method of claim 7, wherein a prescribed action is associated with each trigger within the authentication failure triggers according to the home system authentication center's authentication policy.

10. The method of claim 9, wherein the prescribed action includes one of the following selected from the group consisting of:
    deny access, deny access and convey an authentication request to the network authentication center, perform a unique challenge, allow access to the communications network, allow access to the communications network and convey an authentication request to the network authentication center, and report the authentication failure to the network authentication center of the home system and await a response.

11. A wireless communications network comprising:
    a home system having an authentication center, a network information element, a prescribed authentication capable mobile station of said home system, and shared secret data associated with the prescribed mobile station, the authentication center for performing an authentication of the prescribed mobile station upon a network access by the prescribed mobile station when the mobile station is within a service region of said home system;
    a serving system having a network access element and a network information element associated with the network access element, said serving system capable for performing authentication upon authentication capable mobile station of said serving system; and
    authentication failure triggers shared by the authentication center of said home system with said serving system, wherein upon the mobile station's initial system access within a service region of said serving system, an authentication request operation is conducted between said serving system and said home system, wherein said home system's authentication center authenticates the mobile station and if authentic, then shares the mobile station's shared secret data and authentication failure triggers with said serving system, the authentication failure triggers including instructions for use by said serving system to resolve authentication failures which may occur on subsequent system accesses within the serving system's service region, to handle authentication failures of the prescribed mobile station without requiring said serving system to send any subsequent authentication failure report messages to said home system.

12. The wireless communications network of claim 11, wherein the network access element of said serving system initiates an authentication request operation (AUTHREQ) upon a system access of the mobile station;

the network information element processes the authentication request by verifying a correctness of the authentication information, including s numeric authentication response from the mobile station, and     if the verification results in an authentication failure, then the network information element directs the network access element to complete the authentication operation according the mobile station's authentication failure triggers without contacting said home system's authentication center.

13. The wireless communications network of claim 12, wherein the network access element includes a mobile switching center (MSC).

14. The wireless communications network of claim 12, wherein the network information element includes a visitor location register (VLR).

15. The wireless communications network of claim 12, wherein the processing of the authentication request operation includes an evaluation of the mobile station's authentication response locally in the serving system network information element.

16. The wireless communications network of claim 12, wherein the network access element includes a mobile switching center (MSC), wherein the network information element includes a visitor location register (VLR), and wherein the processing of the authentication request operation includes an evaluation of the mobile station's authentication response locally in the serving system network information element.

17. The wireless communications network of claim 12, wherein the mobile station's authentication failure triggers are referenced by the network information element of said serving system when an authentication failure occurs in order to direct the network access element of said serving system on how to complete the authentication operation, according to a prescribed policy of the authentication center of said home system.

18. The wireless communications network of claim 17, wherein the mobile station's authentication failure triggers include at least a subset of the following triggers selected from the group consisting of:

authentication result (AUTHR) mismatch, unique challenge (U.C.) failure/no response, RANDC mismatch, and missing authentication parameters.

19. The wireless communications network of claim 17, wherein a prescribed action is associated with each trigger of the authentication failure triggers according to an authentication policy of said home system's authentication center.

20. The wireless communications network of claim 19, wherein the prescribed action includes one of the following selected from the group consisting of: deny access, deny access and convey an authentication request to the network authentication center, perform a unique challenge, allow access to the communications network, allow access to the communications network and convey an authentication request to the network authentication center, and report the authentication failure to the network authentication center of said home system and await a response.

\* \* \* \* \*

UNITED STATES PATENT AND TRADEMARK OFFICE
CERTIFICATE OF CORRECTION

PATENT NO. : 6,236,852 B1  Page 1 of 1
DATED : May 22, 2001
INVENTOR(S) : Veerasamy et al.

It is certified that error appears in the above-identified patent and that said Letters Patent is hereby corrected as shown below:

Column 2,
Line 48, replace "(VLR)" with -- (VLR) 20 --

Signed and Sealed this

Second Day of July, 2002

Attest:

JAMES E. ROGAN
Attesting Officer  Director of the United States Patent and Trademark Office